United States Patent [19]

Neumann

[11] Patent Number: 4,551,101
[45] Date of Patent: Nov. 5, 1985

[54] SIMULATOR FOR TRAINING AIRPLANE PILOTS

[75] Inventor: Jacques Neumann, Forest, Belgium

[73] Assignee: Ateliers de Constructions Electriques de Charleroi (ACEC)-Societe Anonyme, Brussels, Belgium

[21] Appl. No.: 652,019

[22] Filed: Sep. 19, 1984

[30] Foreign Application Priority Data

Sep. 20, 1983 [EP] European Pat. Off. ........ 83201347.8

[51] Int. Cl.$^4$ .............................................. G09B 9/08
[52] U.S. Cl. ..................................................... 434/55
[58] Field of Search .................. 434/55, 56, 57, 58, 434/38, 43, 44, 46

[56] References Cited

U.S. PATENT DOCUMENTS

| Re. 27,051 | 2/1971 | Cappel | 434/58 |
|---|---|---|---|
| 2,687,580 | 8/1954 | Dehmel | 434/55 |
| 2,787,842 | 4/1957 | Smith et al. | 434/46 |
| 2,924,028 | 2/1960 | Geisse | 434/44 |
| 2,930,144 | 3/1960 | Fogarty | 434/58 |
| 3,645,011 | 2/1972 | Callanen | 434/58 |
| 4,019,261 | 4/1977 | Pancoe | 434/58 |
| 4,478,407 | 10/1984 | Manabe | 434/58 X |

FOREIGN PATENT DOCUMENTS

| 1080074 | 8/1967 | United Kingdom . |
|---|---|---|
| 1350941 | 4/1974 | United Kingdom . |
| 1545121 | 5/1979 | United Kingdom . |

Primary Examiner—William H. Grieb
Attorney, Agent, or Firm—Schwartz, Jeffery, Schwaab, Mack, Blumenthal & Evans

[57] ABSTRACT

In a simulator for training airplane pilots comprising a base positioned on the ground (24), a platform supporting an airplane equipment station of which the interior reproduces the interior of a real cockpit (17) and an assembly of jacks (15) and scissors (16) disposed between the base (24) and the platform and actuated by means of a hydraulic control system, the platform is replaced by a cross-braced self-supporting structure in the form of a basket (18), the base of which coincides with the base of the simulated cockpit (17) and the upper edge of which is located approximately at the height of the lower edges of the windows of the simulated cockpit (17), the jacks (15) and the scissors (16) connecting the base to the structure (18) being fixed in at least three places in proximity to the upper edge of the said structure (18) and being directed toward the base (24), mounted on the ground, in spaced apart relationship from said structure.

6 Claims, 2 Drawing Figures

SIMULATOR FOR TRAINING AIRPLANE PILOTS

This invention relates to a simulator of the type used for training airplane pilots, and more particularly to such a simulator of improved structure.

BACKGROUND AND OBJECTS

There are known in the prior art simulators for training airplane pilots comprising a base placed upon the ground, a platform supporting an airplane cockpit or equipment station of which the interior reproduces the appearance of an actual cockpit, and an assembly of jacks, and possibly scissors positioned between the base and the platform and actuated by means of a hydraulic control apparatus. Such simulators are described, for example, in U.S. Pat. Nos. 2,787,842; 2,924,028 and Re. 27,051.

The present invention has as an object a simulator of the type described above with particularly nimble performance, which may be mounted and housed in hangars of normal dimensions, even when the height of such hangars does not exceed about 4 meters, while permitting sufficiently ample movement of three, four, five or even six degrees of freedom.

DESCRIPTION OF THE INVENTION

The simulator according to the invention is characterized in that the conventional very heavy and rigid platform is replaced by a self-supporting structure in the form of a basket, the base of which coincides with the base of the simulated cockpit, and the upper edge of which is located approximately at the height of the lower edges of the cockpit windows, and in that the jacks, and ultimately the scissors, connecting the base to the self-supporting structure are fixed in at least three places in proximity to the upper edge of the is structure and are directed towards the base positioned on the ground while diverging from the self-supporting structure.

DESCRIPTION OF THE DRAWINGS

The invention is described hereinbelow by reference to an example of one form of carrying out the invention with reference to the attached drawings.

DESCRIPTION OF THE PREFERRED EMBODIMENTS

Figure 1:
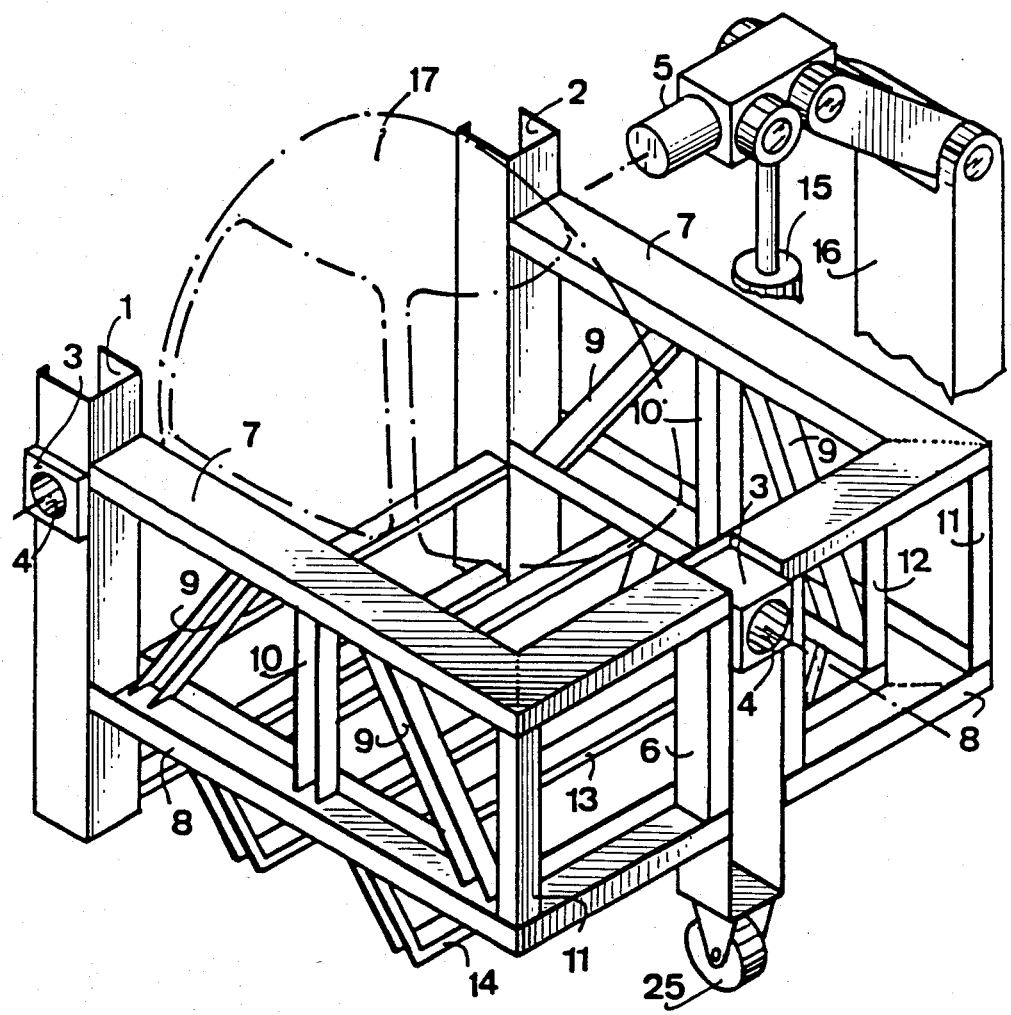
FIG. 1 of the drawings is a perspective view of a basic assembly according to the invention, comprising a self-supporting structure in the form of a basket, a base (not shown) and an assembly of jacks and scissors for connecting the base and the self-supporting structure.

In FIG. 1, a self-supporting structure in the form of a basket comprises two rear posts 1 and 2, each provided with a bearing block 3 of which the bore 4 is intended to receive a trunion 5 shown removed from the bore of the block mounted on the post 2. Another post 6 similarly provided with a bearing block is disposed in the plane of symmetry of the posts 1 and 2 in the frame ahead of the self-supporting structure. This structure is formed of two very large U-shaped frames 7 and 8, maintained at a distance from one another by means of relatively small cross bars 9, 10, 11 and 12. The bottom of the structure of the basket is defined by the small beams 13 and is reinforced by the supports 14 extending toward the base.

The self-supporting structure in the form of a basket is thus comprised of bracing beams whereby the interior edges of the frames 7 and 8 and the cross beams 9, 10 and 12 define an interior surface of the basket, and whereby the exterior edges of the frames 7 and 8 and the cross bars 11 define an exterior surface. Between these two surfaces is reserved a space of a size equal to the thickness of the U-shaped beams of the frames 7 and 8 or, however, as under these circumstances, the size of the posts 1, 2 and 6. This space between the two surfaces, interior and exterior of the basket may be reserved, at least in part, for protecting the cables and control circuits of the simulator. At the same time, the space below the small beams 13 defines the base of the structure in the basket and above the reinforcing supports 14.

The journal blocks 3, solidly secured to the posts 1, 2 and 6 at the height of the upper edge of the self-supporting structure, permit attaching this structure to the assemblies of jacks and/or scissors. Under the circumstances, each bearing block 3 may receive a trunion 5 connected at one part to a jack 15 and at the other part to scissors 16 as shown schematically, withdrawn from the bore 4, in FIG. 1. In such a case, the simulator may carry out movements along three degrees of freedom, notably the assent and descent, the pitch around an axis essentially parallel to the axis passing through the posts 1 and 2, and the rolling about an axis essentially parallel to the axis passing through the bore 4 of the post 6, perpendicular to the axis of pitch.

It is possible to augment the number of degrees of freedom of movement of the simulator up to 6. It would be sufficient to replace the scissors, either in part or in whole, by jacks. At any rate, the greater the number of degrees of freedom, the more expensive is the control apparatus.

On the interior surface of the basket structure is fixed the interior rigging of an airplane cockpit 17, shown in dotted lines.

Figure 2:
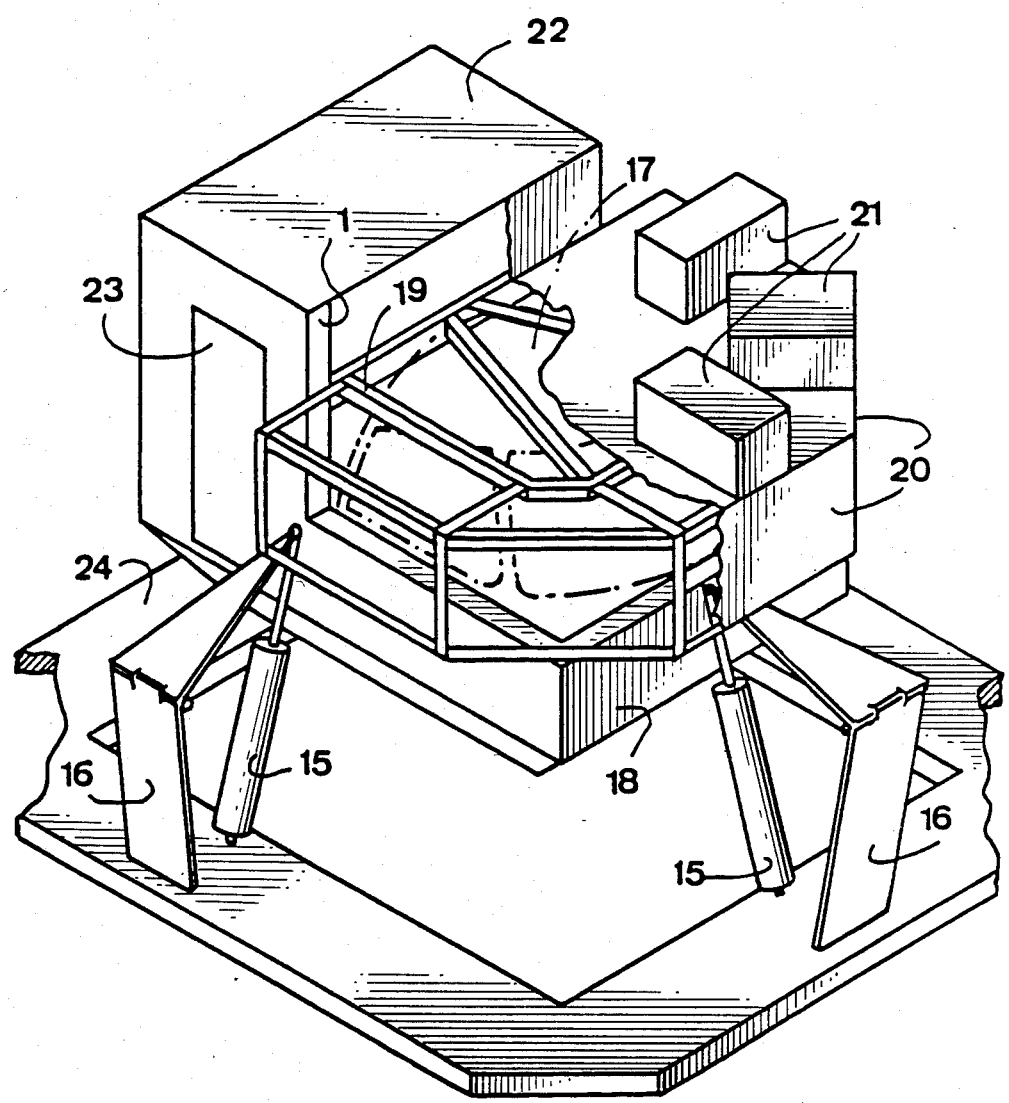
FIG. 2 is a perspective view of a simulator according to the invention completely equipped.

FIG. 2 represents a perspective view of a simulator representing the principle arrangement shown in FIG. 1.

The self-supporting basket structure here is shown as 18, but covered with sheet metal. The interior rigging of the airplane cockpit is visible across a support beam 19 for an assembly of screens 20 combined with projectors 21 and mirrors (not shown in the drawings). The support frame 19 is preferably fixed on the posts 1 and 2 of the basket structure. In FIG. 2, the post 2 is not visible because it is hidden by sheet metal.

Upon posts 1 and 2 may be fixed in addition a room 22 for the instructor of the student pilot. A door 23 for this room may comprise the sole access to the interior of the simulator as well.

FIG. 2 also shows in a schematic manner the positioning of the jacks 15 and scissors 16 on a base 24 in the form of a frame.

In the assembly for three degrees of freedom shown in FIG. 1, the bores 4 of the journals 3 supported on the posts 1 and 2 are arranged on the same axis. On the other hand, the scissors 16 connected to the trunions 5 engage in the bores 4 necessarily maintaining the axis passing through these two bores 4 in the perpendicular plane in which may evolve the extremities of the two scissors carrying the trunions 5. Due to these arrangements, it is possible to avoid a vertical axis of rotation between the two trunions and the scissors 16 which support them.

By contrast, such a vertical axis of rotation or swivel joint is in general indispensable in place of the trunion 5 engaged in the bore 4 of the journal block 3 mounted on the support 6. In effect, in this place, the swivel joint (or ball and socket joint) can only be eliminated for movements of very small amplitude.

The posts 1, 2 and 6 are elongated toward the base to a level approximately at or below the lowest point of the cross bar structure in the basket. At the lower extremity of these extensions is provided an arrangement for fixing the wheels 25 as shown mounted in place on the post 6. These wheels permit the movement of the self-supporting structure as well as the framework in a hanger which is not equipped with a moving bridge. Before complete assembly of the frame forming the base 24 mounted on the ground, the completely equipped self-supporting structure is moved on its wheels to the interior of the framework whereby the assembly is then completed. Once the trunions 5 are engaged in the bores 4 of the journal blocks 3 of the self-supporting structure, they may be raised by means of jacks, and the wheels may be removed.

Due to the cross-braced, self-supporting basket structure 18, which replaces the platform of known simulators by a very lightweight element, great accelerations may be realized by means of a hydraulic control apparatus, (not shown), of moderate power. The fact that the jacks 15 and scissors 16 are fixed in proximity to the upper edges of the self-supporting structure 18 and diverge from it through an angle of necessarily limited size, may have as a consequence the limitation to some extent of lateral displacement of the simulator, but presents the great advantage of reducing the total height necessary to the free development of simulator movements. In any manner, for a simulator of only three degrees of freedom, this limitation of lateral displacements is without great importance. On the other hand, due to the fact that the jacks 15 and scissors 16 are fixed in proximity to the upper edges of the self-supporting structure, it is possible to install the simulator in a hangar, the height of which scarcely exceeds 4 meters. For the same reason, access to the simulator through the door 23 does not necessitate the use of ladders or cumbersome mobile staircases, since this door may be lowered to a very low level, facilitating access and making it possible to safely exit the apparatus urgently and at any moment.

I claim:

1. A simulator for training airplane pilots comprising a base positioned on the ground (24), a basket supporting an airplane equipment station, the interior of which reproduces the interior of a real cockpit (17) and an assembly of jacks (15) and scissors (16) arranged between the base (24) and the basket and actuated by means of a hydraulic control apparatus, characterized in that the basket comprises a cross-braced, self-supporting structure (18), the bottom of which coincides with the bottom of the simulated cockpit (17) and the upper edge of which is located approximately at the height of the lower edges of the windows of the simulated cockpit (17), and wherein said jacks (15) and said scissors (16) connecting said base to said structure (18) are fixed in at least three places in proximity to the upper edge of said structure (18) and are directed toward the base (24) positioned on the ground and spaced laterally from said structure.

2. A simulator according to claim 1, characterized in that the said structure is formed of cross-braced beams (7-14) providing a space between the exterior and the interior surfaces thereof, and in that the rigging of the airplane cockpit (17) is fixed to beams of said cross-braced structure defining the interior surface, and in that at least a portion of the space between said interior surface and said exterior surface houses cables and portions of control circuits for said simulator.

3. A simulator according to claims 1, characterized in that on said structure is fixed a room (22) for an instructor.

4. A simulator according to claim 3, characterized in that on said structure or on said room (22) is attached a support beam (19) for the installation of visual simulation equipment.

5. A simulator according to claim 2, characterized in that the said structure comprises three posts (1, 2, 6) having bearing blocks for trunions (5) actuated by jacks (15) and provided with fixtures for the attachment of wheels (25).

6. A simulator according to one claim 5, characterized in that the bores of said bearing blocks of two of said posts (1, 2, 6) are disposed along the same axis, and in that the trunions (5) engaged in said bores are connected to jacks (15) which support the trunions.

* * * * *